United States Patent
Murao et al.

(10) Patent No.: US 9,626,570 B2
(45) Date of Patent: Apr. 18, 2017

(54) VEHICLE CONTROL SYSTEM AND IMAGE SENSOR

(71) Applicant: DENSO CORPORATION, Kariya, Aichi-pref. (JP)

(72) Inventors: Toshikazu Murao, Obu (JP); Kentarou Shiota, Nagoya (JP); Naoki Sugiyama, Obu (JP); Takayuki Kimura, Southfield, MI (US)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/497,450

(22) Filed: Sep. 26, 2014

(65) Prior Publication Data
US 2015/0086079 A1 Mar. 26, 2015

(30) Foreign Application Priority Data
Sep. 26, 2013 (JP) ................. 2013-199973

(51) Int. Cl.
*G06K 9/00* (2006.01)
*H04N 7/18* (2006.01)
(Continued)

(52) U.S. Cl.
CPC ....... *G06K 9/00791* (2013.01); *G06K 9/2018* (2013.01); *G06T 7/20* (2013.01); *H04N 7/18* (2013.01)

(58) Field of Classification Search
CPC .... G06K 9/00791; G06K 9/2018; G06T 7/20; H04N 7/18
See application file for complete search history.

(56) References Cited

U.S. PATENT DOCUMENTS 5,796,430 A 8/1998 Katoh et al.
6,204,881 B1 3/2001 Ikeda et al.
(Continued)

FOREIGN PATENT DOCUMENTS

DE 102007034608 1/2009
EP 1400916 3/2004
(Continued)

OTHER PUBLICATIONS

Extended European Search Report dated Aug. 14, 2015, issued in the corresponding European application No. 14186537.8.
(Continued)

*Primary Examiner* — Li Liu
(74) *Attorney, Agent, or Firm* — Harness, Dickey & Pierce, P.L.C.

(57) ABSTRACT

A vehicle control system includes a light-receiving section which has a plurality of filters having different pass bands, and a plurality of light-receiving elements, each of which receives incident light via any one of the filters; an image data generation section which, when receiving general image data which is an output of the light-receiving section, extracts outputs of the light-receiving elements correlated to the filters to generate discrete image data, which is image data for each of the filters; an image data processing section which detects at least one object, based on the discrete image data generated by the image data generation section or composite image data generated by combining the discrete image data; and a vehicle control section which performs vehicle control, according to the object detected by the image data processing section.

8 Claims, 7 Drawing Sheets

(51) Int. Cl.
*G06T 7/20* (2017.01)
*G06K 9/20* (2006.01)

(56) References Cited

U.S. PATENT DOCUMENTS

| | | |
|---|---|---|
| 6,611,610 B1 | 8/2003 | Stam et al. |
| 7,512,252 B2 | 3/2009 | Otsuka et al. |
| 7,865,280 B2 | 1/2011 | Fujinawa et al. |
| 9,139,140 B2 | 9/2015 | Karl |
| 2004/0027458 A1 | 2/2004 | Takada |
| 2004/0051790 A1* | 3/2004 | Tamaru et al. ............ 348/223.1 |
| 2004/0091133 A1 | 5/2004 | Monji |
| 2006/0087747 A1 | 4/2006 | Ohzawa et al. |
| 2006/0125919 A1 | 6/2006 | Camilleri et al. |
| 2007/0183657 A1* | 8/2007 | Kidono et al. ................ 382/162 |
| 2008/0030374 A1 | 2/2008 | Kumon et al. |
| 2008/0165264 A1* | 7/2008 | Saito et al. .................. 348/296 |
| 2008/0218597 A1* | 9/2008 | Cho ........................... 348/222.1 |
| 2008/0219585 A1* | 9/2008 | Kasai et al. .................. 382/274 |
| 2008/0303919 A1* | 12/2008 | Egawa ....................... 348/223.1 |
| 2009/0010494 A1* | 1/2009 | Bechtel et al. ............... 382/104 |
| 2010/0254595 A1 | 10/2010 | Miyamoto |
| 2010/0259628 A1 | 10/2010 | Rous |
| 2010/0265330 A1 | 10/2010 | Li et al. |
| 2011/0163904 A1 | 7/2011 | Alland et al. |
| 2011/0234805 A1 | 9/2011 | Matsuda et al. |
| 2011/0267467 A1 | 11/2011 | Kimura et al. |
| 2012/0001791 A1* | 1/2012 | Wintermantel ............... 342/109 |
| 2012/0033079 A1 | 2/2012 | Karl |
| 2012/0062746 A1* | 3/2012 | Otsuka et al. ................ 348/148 |
| 2014/0232900 A1* | 8/2014 | Wernersson ............... 348/223.1 |
| 2014/0347530 A1 | 11/2014 | Kanou et al. |
| 2015/0172618 A1* | 6/2015 | Takahashi et al. ........ 348/223.1 |

FOREIGN PATENT DOCUMENTS

| | | |
|---|---|---|
| EP | 1887492 | 2/2008 |
| EP | 2189340 A2 | 5/2010 |
| JP | S5979872 A | 5/1984 |
| JP | 05-176233 | 7/1993 |
| JP | 10-269352 | 10/1998 |
| JP | 2005-092857 | 4/2005 |
| JP | 2005-157670 | 6/2005 |
| JP | 4034565 | 11/2007 |
| JP | 2008-040615 | 2/2008 |
| JP | 2009-061812 | 3/2009 |
| JP | 2010-020483 | 1/2010 |
| JP | 2010-102572 | 5/2010 |
| JP | 2010-141583 | 6/2010 |
| JP | 2011-233763 | 11/2011 |
| JP | 2012-073927 | 4/2012 |
| JP | 2012-088785 | 5/2012 |
| JP | 2012-146142 | 8/2012 |
| WO | WO-2013088821 A1 | 6/2013 |

OTHER PUBLICATIONS

Office Action dated Jun. 7, 2016 issued in U.S. Appl. No. 14/593,136.
Office Action dated Dec. 1, 2016 issued in U.S. Appl. No. 14/919,758.

* cited by examiner

VEHICLE CONTROL SYSTEM AND IMAGE SENSOR

CROSS-REFERENCE TO RELATED APPLICATION

This application is based on and claims the benefit of priority from earlier Japanese Patent Application No. 2013-199973 filed Sep. 26, 2013, the description of which is incorporated herein by reference.

BACKGROUND

Technical Field

The present invention relates to a technique for detecting an object using an image and a technique for performing vehicle control using the detected object.

Related Art

In a known technique, various objects that are present around the vehicle are detected using picked-up images that are acquired from an in-vehicle camera. In the technique, the detection results are provided to the vehicle driver or used for various vehicle control processes.

If an imaged scene has a high contrast, the image has overexposure areas or underexposure areas due to the insufficient dynamic range of the camera. These overexposure areas or underexposure areas may prevent detection of the objects that are present in the areas.

On the other hand, in another known technique, a plurality of images that are picked up under different exposure conditions are acquired, and image recognition is conducted using portions having good contrast of the plurality of images (e.g., see UP-A-2012-088785).

The conventional art as mentioned above uses a plurality of images that are acquired at different time points and therefore it is necessary to determine whether or not the objects detected in the individual images are identical. The processing involved in this determination problematically takes time. In addition to this, the conventional art suffers from problems, such as that a single object may be erroneously detected as being a plurality of different objects, or different objects may be erroneously detected as being a single object.

SUMMARY

An embodiment improves the accuracy of detecting an object by using an image.

As an aspect of the embodiment, a vehicle control system is provided which includes: a light-receiving section which has a plurality of filters having different pass bands, and a plurality of light-receiving elements, each of which receives incident light via any one of the filters; an image data generation section which, when receiving general image data which is an output of the light-receiving section, extracts outputs of the light-receiving elements correlated to the filters to generate discrete image data, which is image data for each of the filters; an image data processing section which detects, based on the discrete image data generated by the image data generation section or composite image data generated by combining the discrete image data, at least one object included in a group of an obstacle, a preceding vehicle, a preceding pedestrian, a preceding object, a stationary vehicle, a stationary pedestrian, a stationary object, an on-corning vehicle, an on-coming pedestrian, an on-coming object, a lane, a road surface condition, a road shape, a light source, a road sign, a traffic signal, an entity which cuts off a field of view of the light-receiving section, and an environmental feature outside a vehicle; and a vehicle control section which performs, according to the object detected by the image data processing section, vehicle control regarding at least one of collision avoidance, speed warning, lane departure prevention, rear-end collision warning, inter-vehicle warning, lane departure warning, auto high beam, sign indication, full speed range adaptive cruise control, lane keeping, lane change accident prevention, blind spot warning, blind spot monitoring, automatic lane change, forward cross traffic warning, rearward cross traffic warning, erroneous pedal usage prevention, and automatic parking.

DETAILED DESCRIPTION OF THE PREFERRED EMBODIMENTS

With reference to the accompanying drawings, hereinafter are described embodiments to which the present invention is applied.

First Embodiment

<General Configuration>

Figure 1:
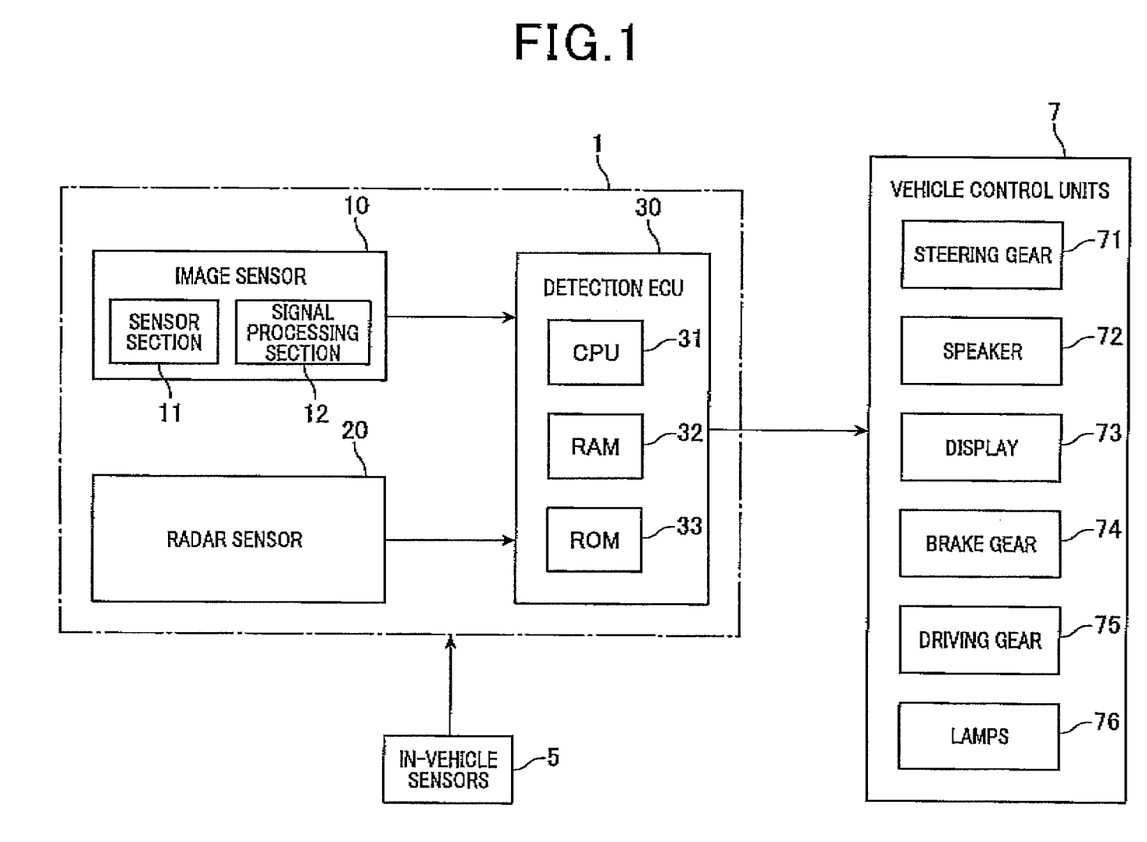
FIG. 1 is a block diagram illustrating a general configuration of a vehicle control system.

FIG. 1 is a block diagram illustrating a general configuration of a vehicle control system 1 according to a first embodiment. The vehicle control system 1 detects various objects that are present around the vehicle. Based on the detection results and various pieces of information acquired from in-vehicle sensors 5, the vehicle control system 1 performs various vehicle controls using vehicle control units 7.

The in-vehicle sensors 5 include sensors that detect the behaviors of the vehicle, and sensors that detect the environmental features surrounding the vehicle. The sensors that detect the behaviors of the vehicle include, for example, a vehicle speed sensor, various acceleration sensors and a steering-angle sensor. The sensors that detect the environmental features surrounding the vehicle include, for example, a unit for outputting position data of the own vehicle (e.g., GPS (global positioning system)), a unit serving as a source of supplying map data (e.g., navigation apparatus), a communication unit (e.g., mobile unit, such as a road-to-vehicle communication unit or a smartphone) and a radar. These sensors are used singly, or the detection results of the sensors are used in combination.

The vehicle control units 7 include a plurality of units that control controlled objects of a body system, a powertrain system and a chassis system of the vehicle. The controlled objects at least include a steering gear (e.g., electric power steering) 71, speaker 72, display 73, brake gear (e.g., brake) 74, driving gear (e.g., accelerator) 75 and lamps 76. The vehicle control units 7 control the behaviors of the controlled object in accordance with the running conditions of the vehicle. In addition, by controlling the behaviors of the controlled objects according to the instructions from a detection ECU 30, the vehicle control units 7 perform known vehicle controls, such as collision avoidance, speed warning, lane departure prevention, rear-end collision warning, inter-vehicle warning, lane departure warning, auto high beam, sign indication, full speed range adaptive cruise control (ACC), lane keeping, lane change accident prevention, blind spot warning, blind spot monitoring, automatic lane change, forward cross traffic warning, rearward cross traffic warning, so erroneous pedal usage prevention, and automatic parking.

<Vehicle Control System>

The vehicle control system 1 includes an image sensor 10, a radar sensor 20 and the detection ECU 30.

The image sensor 10 picks up an image in the forward direction of the vehicle to repeatedly acquire image data, and processes the acquired image data to detect an object that is present in a predetermined imaging range. The image sensor 10 generates object information including at least the position, width and height of an object and outputs the generated object information to the detection ECU 30 together with image data to be displayed.

The radar sensor 20 is a well-known sensor that transmits and receives radar waves of a millimeter-wave band or of laser beams to detect an object that is present in a predetermined exploration range and has reflected the radar waves. The radar sensor 20 generates object information at least including a distance to the object from the vehicle, speed of the object relative to the vehicle, and lateral location of the object with respect to the vehicle and outputs the generated object information to the detection ECU 30.

In generating information regarding a detected object, the image sensor 10 and the radar sensor 20 also make use of the information obtained from the in-vehicle sensors 5. The objects detected by the image sensor 10 and the radar sensor 20 include, for example, an obstacle, preceding vehicles, preceding pedestrians, preceding objects, stationary vehicles, stationary pedestrians, stationary objects, on-coming vehicles, on-coming pedestrians, on-coming objects, lanes, road surface conditions, road shapes, light sources, road signs, traffic signals, entities that cut off the field of view of the sensor section 11, and environmental features outside the vehicle. However, the sensors 10 and 20 do not necessarily have to detect all of these objects but may detect at least those objects which are required for a vehicle control process (discussed later) which is performed by the detection ECU 30.

The detection ECU 30 is mainly configured by a well-know microcomputer that includes at least a CPU 31, RAM 32 and ROM 33. The ROM 33 stores a control program for performing the vehicle control process which realizes the various vehicle controls mentioned above using the vehicle control units 7 on the basis of the information on a detected object, which is outputted from the image sensor 10 and the radar sensor 20. The detection ECU 30 outputs instructions to the vehicle control units 7. In particular, the detection ECU 30 outputs to the display 73 the image data generated by the image sensor 10, or data obtained by processing the image data so as to be suitable for information display.

It should be noted that, in the vehicle control process, all the vehicle controls mentioned above do not have to be necessarily realized but at least one of the vehicle controls may be ensured to be performed. The vehicle controls may be ensured to be properly performed in accordance with the instructions from an external unit or the information acquired from the in-vehicle sensors 5.

<Image Sensor>

The image sensor 10 includes a sensor section 11 and a signal processing section 12. The sensor section 11 converts incident light to electrical signals and outputs the converted signals. The signal processing section 12 carries out an image data generation process for generating image data from the outputs of the sensor section 11, and an object detection process for detecting various objects based on the image data that has been generated through the image data generation process and outputting the detection results to the detection ECU 30. The image sensor 10 is periodically activated to pick up images of the scenes outside the vehicle.

Figure 2:
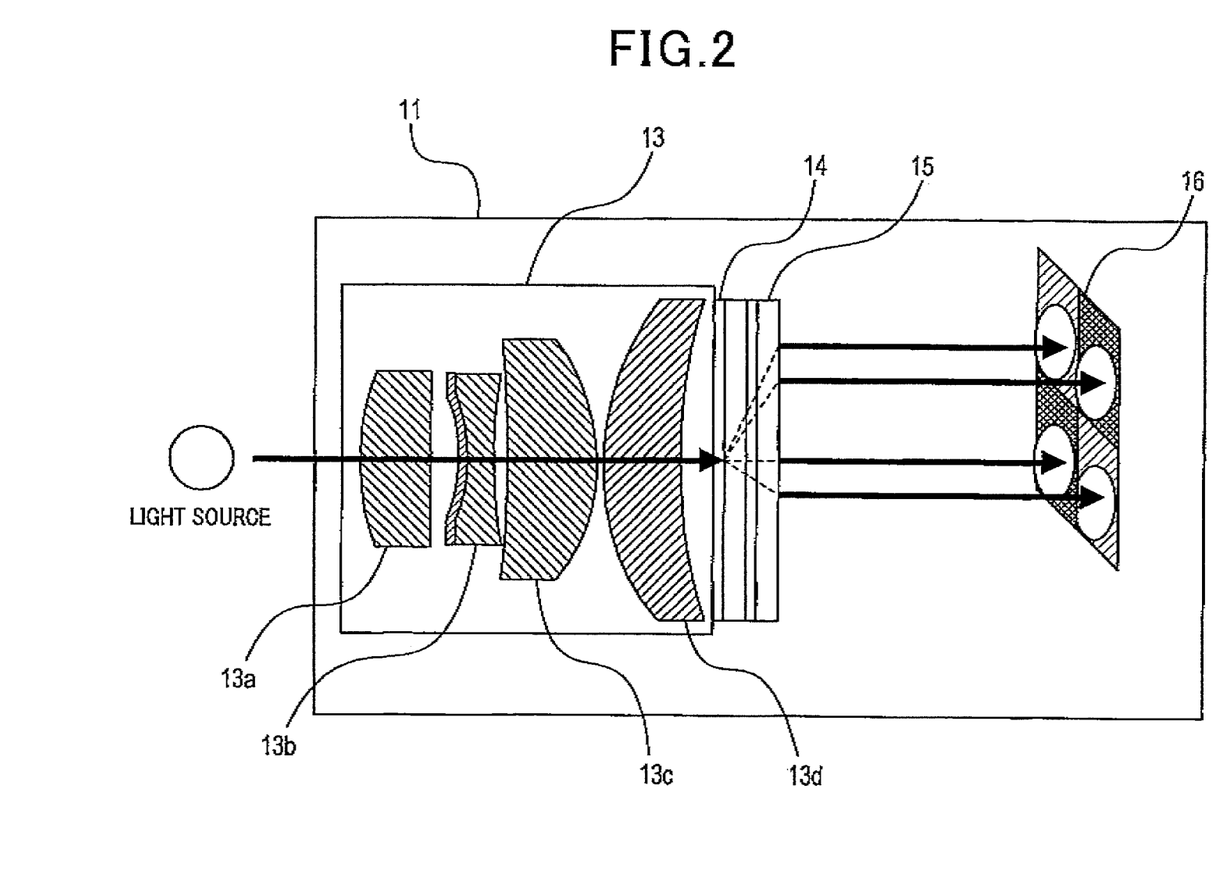
FIG. 2 is a schematic diagram illustrating a sensor section.

The sensor section 11 configures a monocular camera. FIG. 2 is a schematic diagram illustrating the sensor section 11. As shown in FIG. 2, the sensor section 11 includes a lens system 13, an infrared cut filter 14, an optical lowpass filter 15 and an image sensor assembly 16.

The lens system 13 is configured by a plurality of lenses that cause the incident light to form an image on a surface of the image sensor assembly 16. Specifically, the lens system 13 is configured by four lenses which are, from a light-incident side (the left side in the figure), a planoconvex lens 13a, a double concave lens 13b, a plano-convex lens 13c and a concave meniscus lens 13d. With these four lenses, the lens system 13 is ensured to have a structure that prevents aberrations, such as chromatic aberration and comatic aberration.

The infrared cut filter 14 is arranged downstream of the lens system 13 to cut off near-infrared rays included in the incident light. The optical lowpass filter 15 is arranged downstream of the infrared cut filter 14 and configured to split the incident light that has passed through the lens system 13 and the infrared cut filter 14 into four incident light rays, by using the polarization characteristics. The four incident light rays are each ensured to be inputted to any of four pixels that configure a basic unit of the image sensor assembly 16. In the image sensor assembly 16 of FIG. 2, only four pixels configuring the basic unit are shown being enlarged, for the sake of clarity of view and for easy understanding of the operation of the optical lowpass filter 15.

The lens system 13, the infrared cut filter 14 and the optical lowpass filter 15 are well known as disclosed, for example, in JP-A-2011-233763. Therefore, the explanation on the details is omitted.

The image sensor assembly 16 is configured by an array type image sensor and an RGBC Bayer. The array type image sensor is a well-known sensor in which light-receiving elements, such as CMOS sensors and CCD sensors, are arrayed to acquire an optical image. The RGBC Bayer is a collection of a plurality of types of optical filters whose pass bands are different from each other, Each light-receiving element is configured to receive incident light via any one of the optical filters configuring the RGBC Bayer. Each light-receiving element has a light-receiving band which is sensitive at least to a wavelength corresponding to visible light.

Figure 3A:
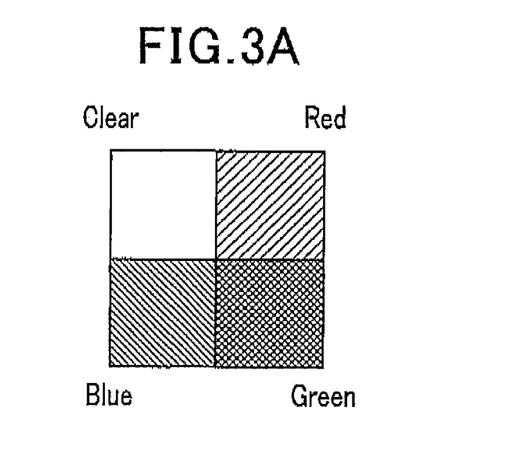
FIGS. 3A and 3B are diagrams illustrating a unit pattern and a general pattern, respectively, each showing an arrangement of filters that configure an RGBC Bayer.
Figure 3B:
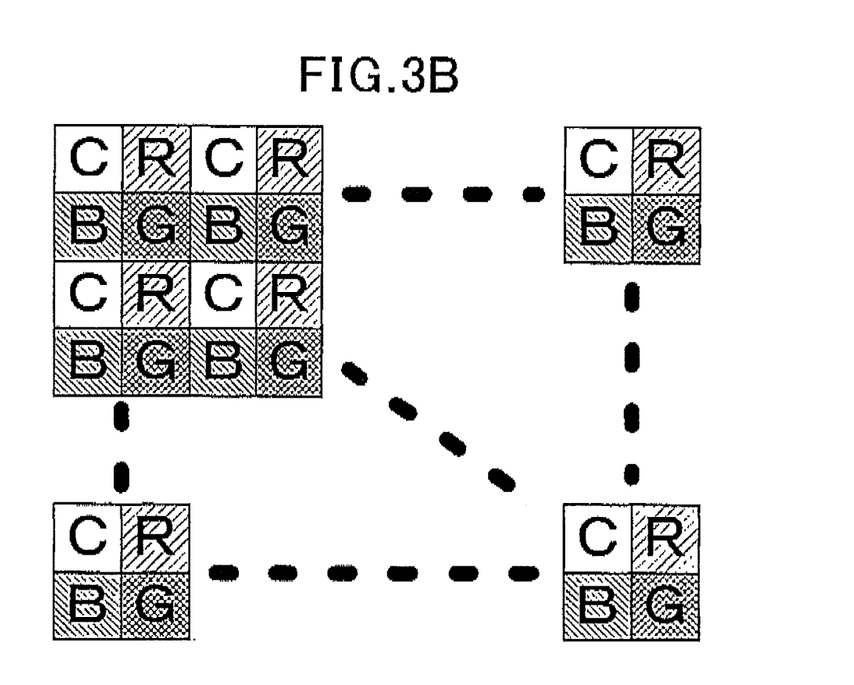

The RGBC Bayer includes optical filters which are correlated to the respective light-receiving elements and arranged in a pattern. The RGBC Bayer here is formed of four types of optical filters which are R (red) filters, G (green) filters, B (blue) filters and C (clear) filters. FIG. 3A is a diagram illustrating a unit pattern that corresponds to the four pixels. FIG. 3B is a diagram illustrating a general pattern in which a collection of the unit patterns Is arranged entirely covering the array type image sensor. In the following description, the four types of optical filters configuring the RGBC Bayer are referred to R filters, G filters, B filters and C filters.

Figure 4:
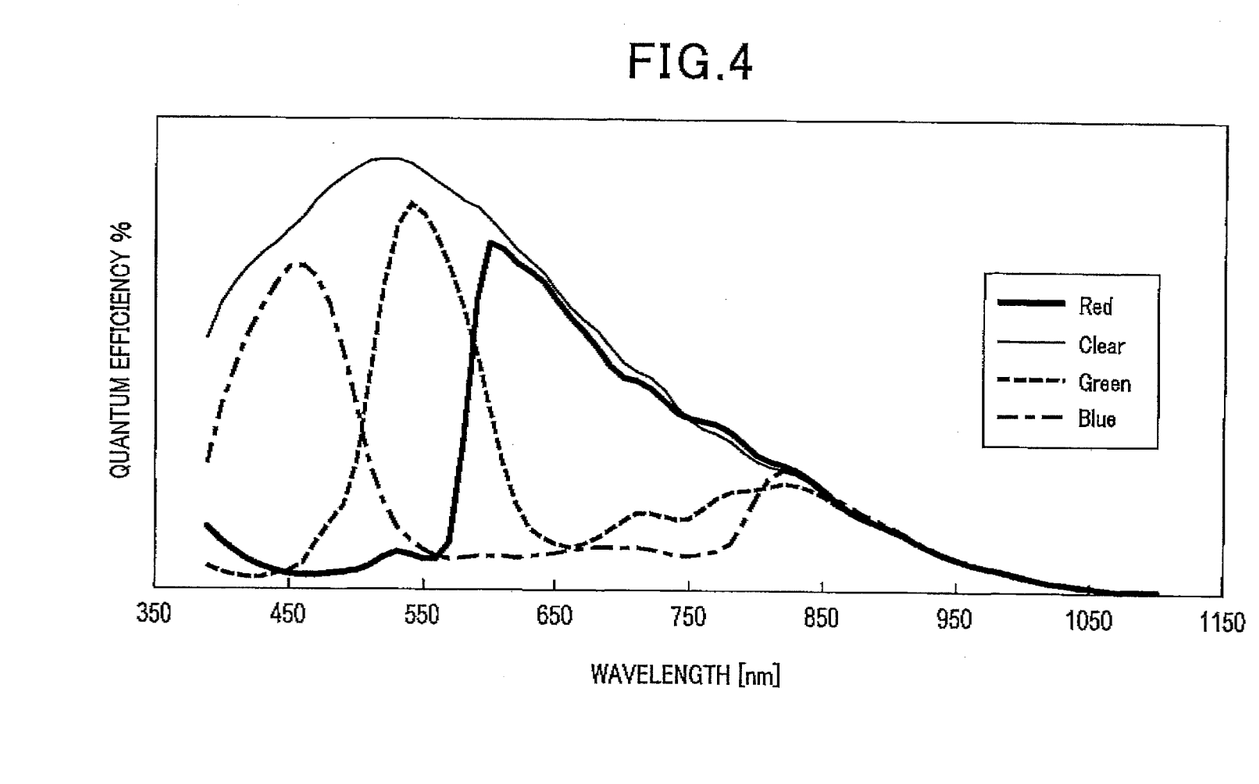
FIG. 4 is a graph showing transmission characteristics of the filters that configure the RGBC Bayer.

FIG. 4 is a graph showing transmission characteristics of the filters of the RGBC Bayer. As shown in FIG. 4, the R, G and B filters (hereinafter also referred to collectively as "color filters") have pass bands which are set so as to pass light with wavelengths corresponding to specified colors (red, green and blue). The pass band of the C filters is set so as to entirely include the pass bands of the three types of color filters and to have a quantum efficiency equal to or more than those of the color filters in each wavelength. In other words, the color filters correspond to the limited filters and the C filters correspond to the all-pass filters.

Further, the sensor section 11 includes an amplifier and an A/D converter, both not shown. The amplifier amplifies with a predetermined gain the outputs that are read out from the light-receiving elements configuring the image sensor assembly 16 (the outputs being analog signals indicating the brightness of the respective pixels), and the A/D converter converts the amplified analog values to digital values (pixel values) and outputs the converted values to the signal processing section 12. The output of the sensor section 11 is hereinafter referred to as "Bayer image data" (corresponding to the general image data), and the image expressed by the Bayer image data is referred to as "Bayer image".

<Signal Processing Section>

The signal processing section 12 is mainly configured by a well-known microcomputer at least including CPU, RAM and ROM. The ROM stores a control program for performing an image data generation process and an object detection process described later.

Figure 5:
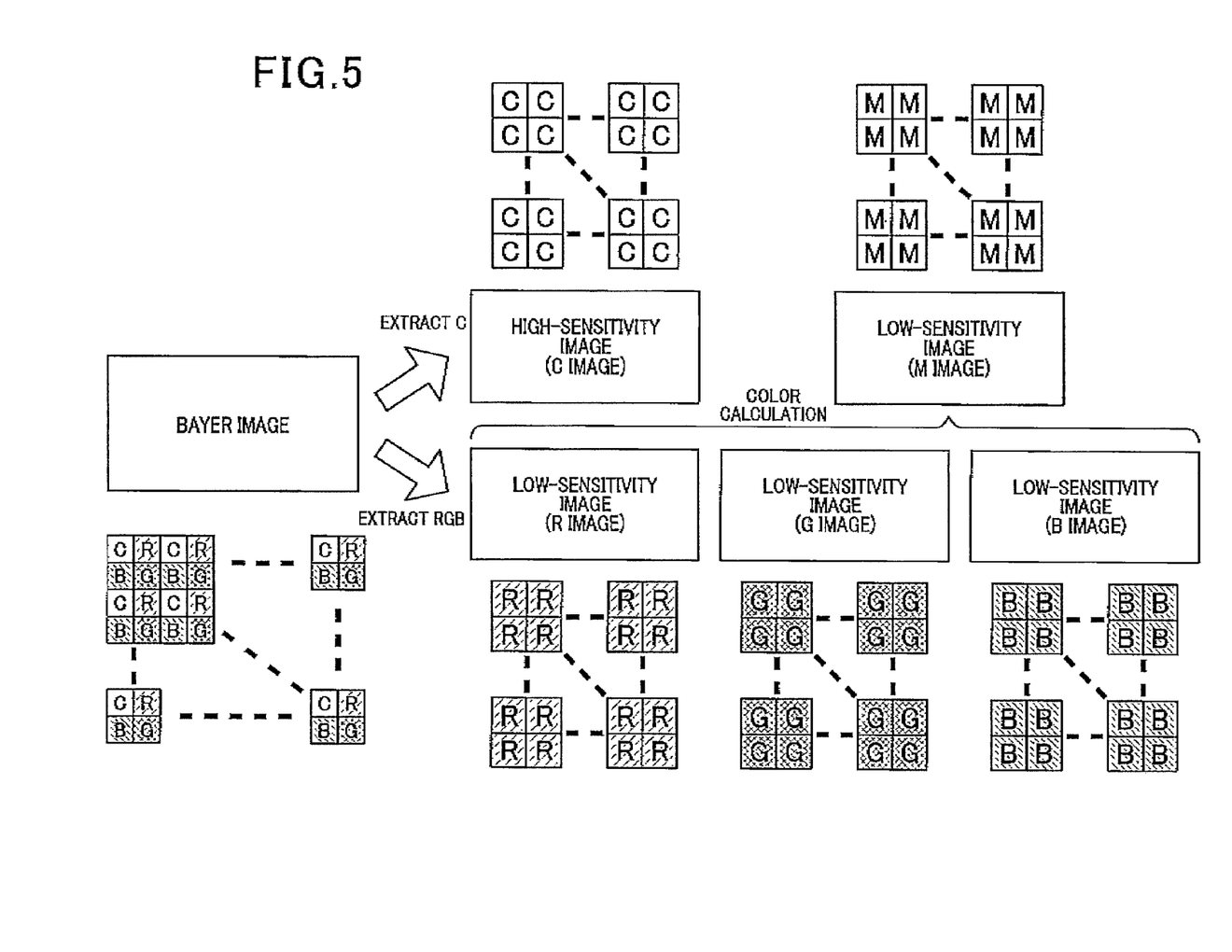
FIG. 5 is a diagram illustrating an image data generation process performed by a signal processing section.

FIG. 5 is a diagram illustrating the image data generation process performed by the signal processing section 12. As shown in FIG. 5, in the image data generation process, upon acquisition of the Bayer image data corresponding to one frame from the sensor section 11, the signal processing section 12 extracts the outputs of the light-receiving elements correlated to the C filters to generate high-sensitivity image data that represents a C image. At the same time, the signal processing section 12 extracts, for each type of color filters, the outputs of the light-receiving elements correlated to each type of the color filters, thereby generating three different low-sensitivity image data that represent an R image, a G image and a B image, respectively. The four different image data obtained in this way are hereinafter referred to as discrete image data.

The filters configuring the RGBC Bayer are uniformly arranged over the entire Bayer image. Accordingly, the discrete image data generated for the individual types of filters are under conditions in which the angles of view and the resolutions are substantially the same.

In the image data generation process, the signal processing section 12 may perform color calculation (summing at a predetermined ratio) on the basis of the three pieces of different low-sensitivity image data to generate one or more different M images (low-sensitivity images of black and white or of arbitrary colors) and the generated M images may be added to the discrete image data.

Figure 6:
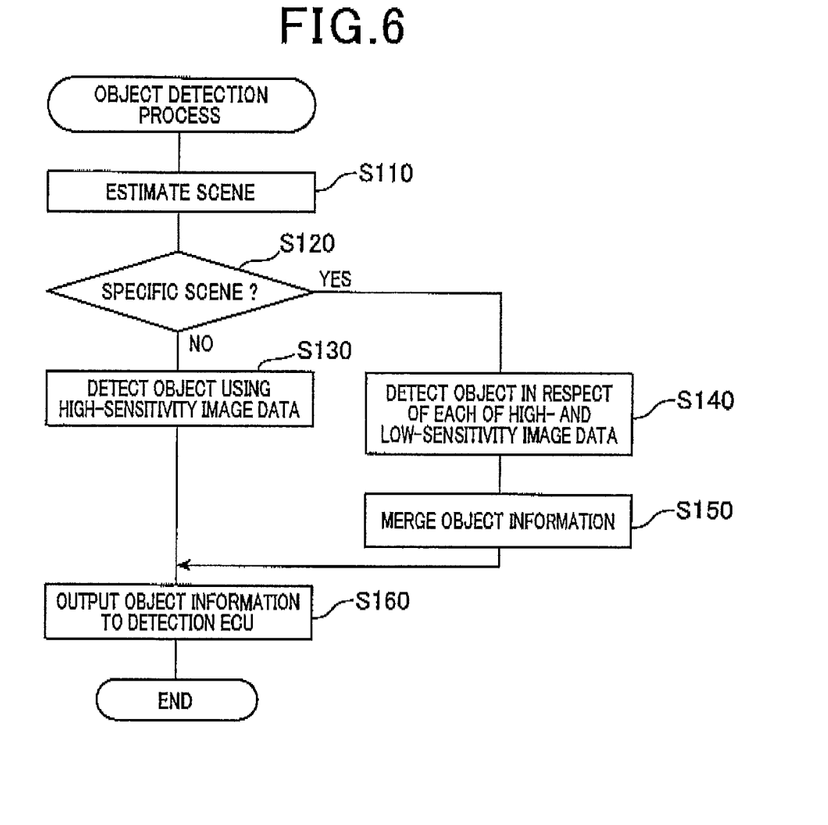
FIG. 6 is a flow diagram illustrating an object detection process performed by the signal processing section.

Referring to FIG. 6, the object detection process is described. FIG. 6 is a flow diagram illustrating the object detection process performed, by the signal processing section 12. The object detection process is started every time the discrete image data corresponding to one frame are generated through the image data generation process.

In the present process, the signal processing section 12 estimates as to what scene is represented by the image (Bayer image) of the Bayer image data that has been acquired by the sensor section 11 (step S110). Then, the signal processing section 12 determines whether or not the estimated scene is a specific scene having a probability of including overexposure areas or underexposure areas due to an insufficient dynamic range (step S120).

Specifically, the signal processing section 12 determines whether or not the estimated scene is a specific scene on the basis of the probability that the image has areas where the brightness is extremely different from other areas in the image. For example, such a specific scene may be a scene that includes an image of a construction (building) that casts a shadow equal to or larger than an object, such as a scene near the entrance/exit of a tunnel, a scene under an elevating structure, or a scene by the side of a building. Such a specific scene can be determined, for example, from the map data (prepared map information) near the present location which is acquired from the navigation apparatus, or the detection results in the past of the object detection process. Alternatively, the determination on the specific scene may be made by making a comparison in the brightness between various portions in the image, on the basis of the Bayer image data or the discrete image data.

If it is determined that the estimated scene is not a specific scene (NO in step S120), the signal processing section 12 performs a process of detecting an object taken in the image on the basis of the high-sensitivity image data (C image data) and generates object information related to the detected object (step S130).

If it is determined that the estimated scene is a specific scene (YES in step S120), the signal processing section 12 selects the high-sensitivity image data and at least one piece of low-sensitivity image data, performs, for each of the selected image data, a process of detecting an object taken in the image, and generates object information related to the detected object (step S140). Further, the signal processing section 12 merges the object information generated in step S140 for the individual image data (step S150). In this case, the objects detected at an identical position in both image data are regarded as being an identical object and combined into one. In other words, since the image data are acquired simultaneously, the objects detected at the same position can be immediately determined to be an identical object without performing another processing, such as tracking.

Then, the signal processing section 12 outputs, to the detection ECU 30, the object information generated in step S130 or S150 together with predetermined image data to be displayed (e.g., the high-sensitivity image data or the image data used for detecting an object) (step S160). Then, the present process is terminated. It should be noted that, in step S160, the object information alone may be outputted to the detection ECU 30.

<Advantageous Effects>

As described above, the vehicle control system 1 generates a plurality of discrete image data having different degrees of brightness (sensitivity) from a piece of Bayer image data. Further, for a specific scene having a high contrast and an insufficient dynamic range, an object is detected using the plurality of discrete image data having different degrees of brightness. Accordingly, for example, in the event that there are areas in any of the high- or low-sensitivity image data, in which an overexposure or an underexposure is caused, an object that is present in the areas is detected on the basis of other image data which are not in such conditions. Thus, objects that are present in the imaging range can be detected without any omission. Specifically, the vehicle control system 1 is able to detect, without any omission, an object which is located in a spot where the object is difficult to detect due to the shadow of a large construction. Such an object includes, for example, a vehicle near the entrance/exit of a tunnel, a pedestrian by the side of a building, a vehicle under an elevating structure, or a vehicle by the side of a bridge rail.

The plurality of discrete image data are generated from a piece of Bayer image data acquired at the same instant. Accordingly, no positional offset of an object is caused between the discrete image data. Thus, the objects that are present at the same position are immediately determined to be an identical object. As a result, an erroneous detection of an object is prevented, i.e. the accuracy of detecting an object is improved, without the necessity of performing a special processing, such as tracking.

Second Embodiment

Figure 7:
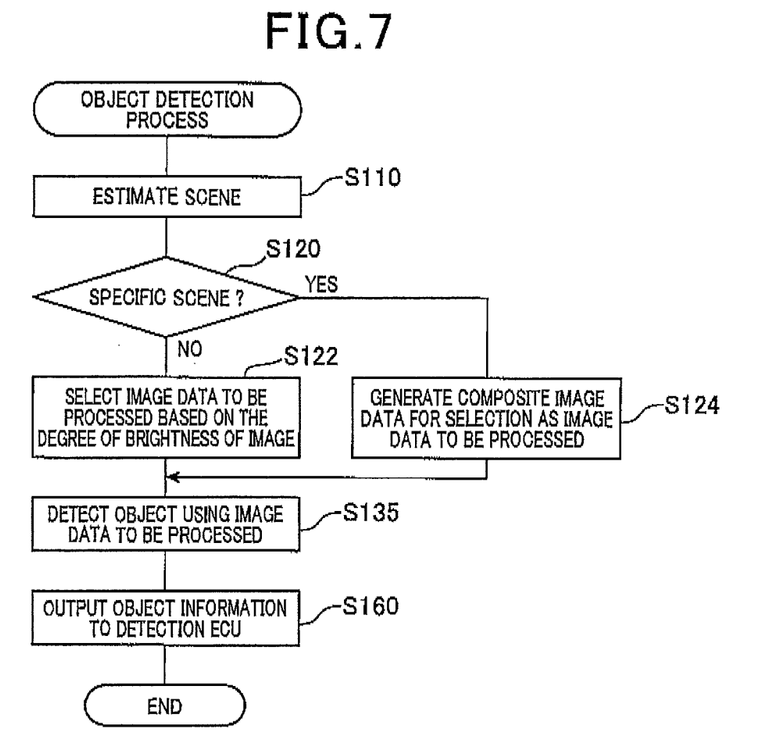
FIG. 7 is a flow diagram illustrating an object detection process, according to a second embodiment.

Referring now to FIG. 7, a second embodiment is described. The second embodiment has a basic configuration similar to that of the first embodiment, with an only difference from the first embodiment being the object detection process performed by the signal processing section 12. Therefore, the following description is focused on the difference, omitting the explanation on the common configuration. Further, in the second and the subsequent embodiments, the components identical with or similar to those in the first embodiment are given the same reference numerals for the sake of omitting unnecessary explanation.

<Object Detection Process>

FIG. 7 is a flow diagram illustrating an object detection process according to the second embodiment. Upon start of the present process, the signal processing section 12 performs scene estimation (step S110) and determines whether or not the estimated scene is a specific scene (step S120).

If it is determined that the estimated scene is not a specific scene (NO in step S120), the signal processing section 12 selects image data to be processed (step S122). Specifically, the signal processing section 12 selects the high-sensitivity image data (C image data) as image data to be processed, if an average brightness of the image based on the C image data is equal to or lower than a predetermined threshold, but selects low-sensitivity image data (any of the R, G, B and M image data) as image data to be processed, if the average brightness is higher than the threshold.

If it is determined that the estimated scene is a specific scene (YES in step S120), the signal processing section 12 generates composite image data by combining the high-sensitivity image data with low-sensitivity image data, and selects the composite image data as image data to be processed (step S124).

In generating the composite image data, the low-sensitivity image data is applied to portions which, if any, are extremely brighter than other portions (areas having a probability of suffering from overexposure) and the high-sensitivity image data is applied to other portions. In contrast, in generating the composite image data, the high-sensitivity image data is applied to portions which, if any, are extremely darker than other portions (areas having a probability of suffering from underexposure) and the low-sensitivity image data is applied to other portions.

Then, the signal processing section 12 performs a process for detecting an object present in the image on the basis of the image data to be processed selected in step S122 or S124 and generates object information related to the detected object (step S135).

Then, the signal processing section 12 outputs the object information generated in step S135 together with predetermined image data to be displayed to the detection ECU 30 (step S160). Then, the present process is terminated.

<Advantageous Effects>

In the present embodiment, when the estimated scene is a specific scene, a piece of composite image data is generated from the plurality of discrete image data generated through the image data generation process, and an object is detected using the composite image data. In this way, since only one image data is to be processed in the object detection process, the processing load in the object detection process is mitigated.

Third Embodiment

A third embodiment is described. The third embodiment has a basic configuration similar to that of the first embodiment, with an only difference from the first embodiment being the object detection process and a part of the processes performed by the detection ECU 30. Therefore, the following description is focused on the difference, omitting the explanation on the common configuration.

<Detection ECU>

In addition to the processes for realizing the various controls over the vehicle described in the first embodiment, the detection ECU 30 performs the following process. In the process, the detection ECU 30 (external unit) outputs, to the image sensor 10, an image data designation instruction that designates image data to be processed which is suitable for detecting an object and necessary for the effectively operating vehicle controls, on the basis of the conditions of the vehicle controls and the conditions surrounding the vehicle (weather, time of day, etc.) obtained from the in-vehicle sensors 5.

<Signal Processing Section>

The signal processing section 12 stores the image data designation instruction from the detection ECU 30 in a predetermined storage area of the RAM.

Then, the object detection process described referring to FIG. 6 or 7 is performed.

However, when the process shown in FIG. 6 is performed, the signal processing section 12 detects an object, in step S130, using discrete image data or composite image data, which is designated by the image data designation instruction that has been stored in the storage area.

When the process shown in FIG. 7 is performed, the signal processing section 12 selects, in step S122, discrete image data or composite image data as image data to be processed which is designated by the image data designation instruction that has been stored in the storage area.

<Advantageous Effects>

According to the present embodiment, an object is detected using discrete image data or composite image data, which is suitable for the vehicle controls currently performed. Thus, the accuracy of detecting an object is further improved.

Specifically, for example, when vehicle controls required for detecting a forward vehicle as an object are underway at nighttime, the detection ECU 30 can output an image data designation instruction for using low-sensitivity image data for the detection of the object because the tail lights of the forward vehicle are extremely bright. Also, when vehicle controls required for detecting a pedestrian as an object are underway at nighttime, the detection ECU 30 can output an image data designation instruction for using high-sensitivity image data for the detection of the object because pedestrians appear dark.

Other Embodiments

It will be appreciated that the present invention is not limited to the configurations described above, but any and all modifications, variations or equivalents, which may occur to those who are skilled in the art, should be considered to fall within the scope of the present invention.

(1) In the foregoing embodiments, there is no definition on the relationship between the imaging range of the image sensor 10 and the exploration range of the radar sensor 20. The imaging range and the exploration range may be determined so as to be overlapped with each other, or may be determined so as to be different from each other. In the case of the former in particular, the data obtained by different types of sensors are comprehensively dealt with. Such sensor fusion can realize higher recognition functions and further improve the accuracy in the detection of an object.

Figure 8:
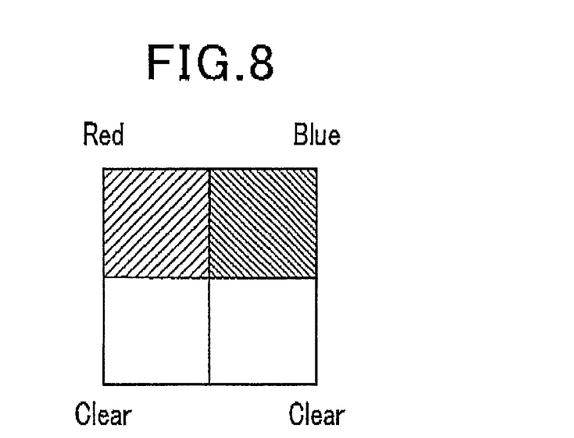
FIG. 8 is a diagram illustrating another configuration example of a basic pattern of Bayer (basic Bayer filter).

(2) As shown in FIG. 3A, different filters are arranged in the four respective pixels of the unit pattern of the RGBC Bayer. Alternatively, different filters may be arranged in the unit pattern on a row-specific basis in the direction of reading the output of the light-receiving elements. For example, as shown in FIG. 8, when the direction of reading the output of the light-receiving elements is the left-and-right direction in the figure, a combination of the R and G filters may be arranged in the upper half, and the C filters alone may be arranged in the lower half. In this case, under the condition that high-resolution image data (C image data) alone is required, only the data in the rows of the light-receiving elements arranged being correlated to the C filters may be read from the sensor section, thereby contributing to reducing the amount of processing. The arrangement of the filters is not limited to the one in the example shown in FIG. 8. For example, monochromatic filters may be alternately arranged in the unit pattern on a row-specific basis. For example, a row of the R filters may be alternated with a row of the C and R filters.

(3) In the foregoing embodiments, the sensor section 11 is configured so that the light-receiving elements can receive the incident light via the RGBC Bayer. Accordingly, a plurality of discrete image data having different degrees of brightness are ensured to be generated from the Bayer image data outputted from the sensor section 11. Similar to this, the radar sensor 20 may also be configured by a receiver section that includes a plurality of types of filters having different pass bands, and a plurality of receiving elements for receiving electromagnetic waves via the respective filters. Thus, based on a general scan data set corresponding to the output of the receiver section, the outputs from the receiving elements correlated to the same type of filters can be extracted. Thus, discrete scan data sets that are the scan data sets of the individual types of the filters may be generated. Then, an object may be ensured to be detected on the basis of the discrete scan data sets or a composite scan data set obtained by combining the discrete scan data sets.

(4) In the foregoing embodiments, the object detection process is performed by the signal processing section 12 of the image sensor 10. Alternatively, the object detection process may be performed by the detection ECU 30. Further, the signal processing section 12 may be omitted from the image sensor 10, and the processes performed by the signal processing section 12 may all be performed by the detection ECU 30.

(5) In the foregoing embodiments, a scene is estimated and, depending on whether the scene is a specific scene, discrete image data used for the detection of an object is ensured to be selected, or composite image data for the detection is ensured to be generated. Alternatively, composite image data may be ensured to be generated from the discrete image data without estimating or judging a scene. For example, in an image, a vehicle in a far distance tends to appear brightly reflecting the sun, for example. Accordingly, composite image data may be generated using low-sensitivity image data for a far distance area, and high-sensitivity image data for a short distance area.

(6) In the foregoing embodiments, any of the discrete image data is used as it is in each area of an image when generating composite image data. Alternatively, image data with a pixel value of an increased bit size and with an adjusted pixel value may be generated as composite image data, so that the dynamic range of the high-sensitivity image data and that of the low-sensitivity image data can both be expressed by single image data.

(7) In the foregoing embodiments, high-sensitivity image data is used when the estimated scene is not a specific scene, while high- and low-sensitivity image data are used singly or in combination when the estimated scene is a specific scene. Alternatively, high-sensitivity image data may be used when the estimated scene is a specific scene, while low-sensitivity image data may be used when the estimated scene is not a specific scene.

(8) In the foregoing embodiments, the high- and low-sensitivity image data are used singly or in combination. However, the high- and low-sensitivity image data may be used through comparison. For example, dark tail lamps in a far distance may have a small pixel value and thus may be drowned out by noise. To cope with this, low-sensitivity image data may be compared with high-sensitivity image data corresponding to the low-sensitivity image data to determine whether or not the candidates of the light sources are noise. In other words, the R image may be checked using the C so image. Specifically, if the C pixel value is not larger than the R pixel value by a predetermined factor or more, the candidates of the light sources may be determined to be noise. Thus, a method of using image data can be suitably applied to a system such as for auto high beam, which is based on light source recognition such as of the tail lamps of a preceding vehicle or the head lights of an on-coming vehicle. Thus, the accuracy of recognizing light sources can be improved.

(9) In the foregoing embodiments, the scene determined to be a specific scene is specifically exemplified to be a scene in which a construction casts a shadow with a size equal to or larger than an object, such as a shadow near the exit/entrance of a tunnel, a shadow under an elevating structure or a shadow by the side of a building. However, a daytime scene or a nighttime scene may be to determined to be another example of a specific scene. For example, in determining a daytime scene or a nighttime scene, a luminance sensor may be used. If the luminance is lower than a predetermined threshold, the scene may be determined to be a nighttime scene. On the other hand, in a bright daytime scene, low-sensitivity image is data may be used to lower the sensitivity. Thus, a target having a periodicity (e.g., vehicle light, LED electronic sign, or traffic light) can be imaged with a longer exposure time, thereby preventing flickering. Further, since a dark nighttime scene contrarily has a high probability of being drowned by noise due to the lowering of sensitivity, high-sensitivity image data may be used. Thus, a method of using image data can be suitably applied to a system such as for speed warning or sign display based on sign recognition. Thus, the accuracy of recognizing signs can be improved.

However, in a dark nighttime scene, if a sign is illuminated with a high beam, the picked-up image may be saturated, disabling recognition of the sign. In this case, whether an image is saturated may be used as a basis for determining a specific scene. If the image is saturated, low-sensitivity image data may be used.

In a bright daytime scene, an image may become extremely dark due to backlight or the like. In this case, whether an image is extremely dark may be used as a basis for determining a specific scene. If an image is extremely dark, high-sensitivity image data may be used to raise the sensitivity.

(10) The components of the present invention are conceptual and should not be construed as being limited to the components of the foregoing embodiments. For example, the function possessed by a single component may be split into a plurality of components, or the functions possessed by a plurality of components may be combined into a single component. Further, at least a part of the configuration in each of the foregoing embodiments may be replaced by a known configuration having the same function. In addition, at least a part of the configuration in each of the foregoing embodiments may be added to or replaced by a different one of the foregoing embodiments.

Hereinafter, aspects of the above-described embodiments will be summarized.

As an aspect of the embodiment, a vehicle control system includes a light-receiving section, an image data generation section, an image data processing section, and a vehicle control section.

The light-receiving section has a plurality of filters having different pass bands, and a plurality of light-receiving elements, each of which receives incident light via any one of the filters. The image data generation section extracts, when receiving general image data which is an output of the light-receiving section, outputs of the light-receiving elements correlated to the filters to generate discrete image data, which is image data for each of the filters. The image data processing section detects, based on the discrete image data generated by the image data generation section or composite image data generated by combining the discrete image data, at least one object included in a group of an obstacle, a preceding vehicle, a preceding pedestrian, a preceding object, a stationary vehicle, a stationary pedestrian, a stationary object, an on-coming vehicle, an on-coming pedestrian, an on-coming object, a lane, a road surface condition, a road shape, a light source, a road sign, a traffic signal, an entity which cuts off a field of view of the light-receiving section, and an environmental feature outside a vehicle.

The entities that cut off the field of view include, for example, stains attached to glass or lenses, cloudy weather, and shielding. The environmental features outside the vehicle include, for example, rain, snow, fog, the sky, clouds, the sun and the moon.

The vehicle control section performs, according to the object detected by the image data processing section, vehicle control regarding at least one of collision avoidance, speed warning, lane departure prevention, rear-end collision warning, inter-vehicle warning, lane departure warning, auto high beam, sign indication, full speed range adaptive cruise control, lane keeping, lane change accident prevention, blind spot warning, blind spot monitoring, automatic lane change, forward cross traffic warning, rearward cross traffic warning, erroneous pedal usage prevention, and automatic parking.

The filters correlated to the receiving elements that are the sources of generating respective discrete image data (image patterns) have different pass bands. Therefore, although the discrete image data are acquired at the same timing, the degrees of brightness of the images expressed by the discrete image data are different from each other.

The vehicle control system of the present embodiment configured in this way enables simultaneous pickup of a plurality of image data having different degrees of brightness. Accordingly, in a picked-up scene having a high contrast with an insufficient dynamic range, image data having a brightness suitable for detecting an object can be properly selected to thereby detect the objects that are present in the imaging range without omission.

Since the plurality of image data are acquired at the same timing, positional offset of an object is not caused between a plurality of images. Accordingly, the objects that are present at the same position are immediately determined to be an identical object. Thus, erroneous detection of an object is prevented and the accuracy of detecting an object is improved.

Other than the vehicle control system described above, the present embodiment can be implemented in various modes, such as: a vehicle control system that includes a receiver section, instead of the light-receiving section, for receiving electromagnetic waves; a vehicle control system that detects an object using both of the outputs of a light-receiving section and a receiver section; and an image sensor that includes a light-receiving section and an image data generation section.

What is claimed is:

1. A vehicle control system for a vehicle, the vehicle control system, comprising:
 a light-receiving section which has a plurality of filters having different wavelength pass bands, and a plurality of light-receiving elements, each of which receives incident light via any one of the filters;
 an image data generation section which, when receiving general image data of a scene around the vehicle which is an output of the light-receiving section, extracts outputs of the light-receiving elements correlated to the filters to generate a plurality of discrete image data, each of the plurality of discrete image data being for a respective one of the plurality of filters;
 an image data processing section which detects, based on at least one of the plurality of discrete image data generated by the image data generation section or composite image data generated by combining two or more of the plurality of discrete image data, at least one object included in a group of objects; and
 a vehicle control section which performs vehicle control according to the at least one object detected by the image data processing section; wherein
 the filters include at least one type of limited filter whose light-receiving band is a band to which the light-receiving elements are sensitive and whose pass band is a part of the light-receiving band, and an all-pass filter whose pass band is at least the combined pass band of the limited filters;
 the image data generation section generates, as the discrete image data, high-sensitivity image data based on the output of the light-receiving section which receives light via the all-pass filter, and low-sensitivity image data based on the output of the light-receiving section which receives light via the limited filter; and the image data processing section selects the high-sensitivity image data if a brightness of the scene around the vehicle is equal to or lower than a predetermined threshold, and the image selection means selects the low-sensitivity image data if the brightness is higher than the predetermined threshold.

2. The vehicle control system according to claim 1, wherein the light-receiving band includes a band corresponding to visible light, and the limited filter has the pass band corresponding to any one of red, green, and blue.

3. The vehicle control system according to claim 1, wherein the light-receiving section has a plurality of light-receiving element rows in which the light-receiving elements are arranged in line and reads outputs of light-receiving elements of each of the light-receiving element rows, and types of the filters applied to the light-receiving elements are limited for each of the light-receiving element rows.

4. The vehicle control system according to claim 1, further comprising an image selection means for selecting the discrete image data used for detecting the object, according to at least one of a type of the object to be detected and the scene of an image represented by the discrete image data, wherein the image data processing section detects the object by using the image data selected by the image selection means.

5. The vehicle control system according to claim 1, wherein the image data generation section includes a scene determination unit determining whether or not a scene represented by the image data is a specific scene having a probability of including overexposure areas or underexposure areas, and if the scene determination unit determines that the scene represented by the image data is the specific scene, the image data generation section generates the composite image data, in which the high-sensitivity image data is used in an area whose brightness is equal to or lower than a predetermined threshold and the low-sensitivity image data is used in an area whose brightness is higher than the predetermined threshold.

6. The vehicle control system according to claim 5, wherein the scene determination unit determines that a scene in which a construction is present is the specific scene, the construction casting a shadow equal to or larger than the object.

7. The vehicle control system according to claim 5, wherein the scene determination unit performs the determination by using at least one of a detection result of the object in the past and prepared map information.

8. The vehicle control system according to claim 1, wherein the filters of the light-receiving section are set so that the discrete image data individually generated for the filters are under conditions in which angles of view and resolutions are substantially the same.

* * * * *